United States Patent
Ito et al.

(10) Patent No.: US 10,204,091 B2
(45) Date of Patent: Feb. 12, 2019

(54) PROVIDING DATA QUALITY FEEDBACK WHILE END USERS ENTER DATA IN ELECTRONIC FORMS

(71) Applicant: International Business Machines Corporation, Armonk, NY (US)

(72) Inventors: Marcia Ito, Sao Paulo (BR); Marco A. S. Netto, Sao Paulo (BR); Vagner F. D. Santana, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 15/157,651

(22) Filed: May 18, 2016

(65) Prior Publication Data

US 2017/0337171 A1 Nov. 23, 2017

(51) Int. Cl.
*G06F 17/24* (2006.01)

(52) U.S. Cl.
CPC .......... *G06F 17/243* (2013.01); *G06F 17/241* (2013.01)

(58) Field of Classification Search
None
See application file for complete search history.

(56) References Cited

U.S. PATENT DOCUMENTS

| | | | |
|---|---|---|---|
| 5,307,262 A | 4/1994 | Ertel | |
| 7,027,931 B1 | 4/2006 | Jones et al. | |
| 7,426,496 B2 | 9/2008 | Kristjansson | |
| 8,156,342 B2 | 4/2012 | Roth et al. | |
| 8,751,436 B2 | 6/2014 | Lowry et al. | |
| 8,935,379 B1 | 1/2015 | Martignoni | |
| 2002/0062342 A1 | 5/2002 | Sidles | |
| 2002/0093530 A1 | 7/2002 | Krothapalli et al. | |
| 2003/0188260 A1 | 10/2003 | Jensen et al. | |
| 2004/0199368 A1 | 10/2004 | Bechhoefer | |
| 2004/0250139 A1 | 12/2004 | Hurley | |
| 2007/0006279 A1 | 1/2007 | Brown et al. | |
| 2008/0120257 A1 | 5/2008 | Goyal et al. | |
| 2008/0307235 A1 | 12/2008 | Keohane et al. | |

(Continued)

FOREIGN PATENT DOCUMENTS

| | | |
|---|---|---|
| EP | 0265574 A1 | 5/1988 |
| WO | 2013043686 A1 | 3/2013 |

OTHER PUBLICATIONS

Paulsen, A., et al., "Quality of Data Entry Using Single Entry, Double Entry and Automated Forms Processing—An Example Based on a Study of Patient-Reported Outcomes", PLoS ONE, Apr. 2012, 7 pages, vol. 7, Issue 4.

(Continued)

*Primary Examiner* — Asher D Kells
(74) *Attorney, Agent, or Firm* — Scully, Scott, Murphy & Presser, P.C.; David M. Quinn, Esq.

(57) ABSTRACT

An automated feedback may be provided while data is entered in an electronic form. Input entered into an input field of a form fillable window provided on a user interface display screen may be detected. A quality measure associated with the input as entered into the form fillable window may be determined. The quality measure is determined based on a quality needed for an analytics process of an application for which the input is being entered. A graphical indication representing the quality measure on the user interface display screen may be presented.

18 Claims, 4 Drawing Sheets

(56) References Cited

U.S. PATENT DOCUMENTS

| | | |
|---|---|---|
| 2010/0179962 A1 | 7/2010 | Schuster |
| 2011/0131479 A1 | 6/2011 | Padgett et al. |
| 2012/0166464 A1* | 6/2012 | Honkola ............ G06F 17/3097 707/758 |
| 2013/0019157 A1* | 1/2013 | Weinand ............... G06F 17/243 715/224 |
| 2016/0063093 A1* | 3/2016 | Boucher ............. G06F 17/3097 707/748 |
| 2016/0063115 A1* | 3/2016 | Ayan ..................... G06Q 50/01 707/722 |
| 2016/0124930 A1* | 5/2016 | Dhawan ................ G06F 17/243 715/224 |
| 2016/0162502 A1* | 6/2016 | Zhou ................... G06F 17/3097 707/722 |
| 2016/0217119 A1* | 7/2016 | Dakin ................... G06F 17/243 |
| 2017/0011308 A1* | 1/2017 | Sun ....................... G06N 99/005 |
| 2017/0046622 A1* | 2/2017 | Gaither ............... G06F 17/2795 |
| 2018/0018310 A1 | 1/2018 | Unsal |

OTHER PUBLICATIONS

Office Action dated Mar. 19, 2018 received in U.S. Appl. No. 15/878,470, 12 pages.

List of IBM Patents or Patent Applications Treated as Related, dated Jan. 24, 2018, 2 pages.

\* cited by examiner

PROVIDING DATA QUALITY FEEDBACK WHILE END USERS ENTER DATA IN ELECTRONIC FORMS

FIELD

The present application relates generally to computers and computer applications, and more particularly to computer user interface, computer-implemented cognitive and machine learning.

BACKGROUND

The quality of the data that is analyzed is a factor in providing accurate data analytics. However, ensuring data quality is a challenge that usually requires human intervention. Several systems rely on manual digitizing of hand written information. Manually digitizing such information, for example, even in systems with pre-validation procedures, may cause erroneous records to be created or result in loss of information. Moreover, data input in electronic forms may be noisy, posing a problem for data analytics.

BRIEF SUMMARY

A system and method of providing automated data quality feedback may be provided. The method, in one aspect, may include detecting input entered into an input field of a form fillable window provided on a user interface display screen. The method may also include determining a quality measure associated with the input as entered into the form fillable window, the quality measure determined based on a quality needed for an analytics process of an application for which the input is being entered. The method may further include presenting a graphical indication representing the quality measure on the user interface display screen. The method may also include repeating the detecting, the determining, and the presenting until the form fillable window is determined to be completed with entry fields.

A method of providing automatic data quality feedback, in another aspect, may include annotating input field data of an electronic form with a quality measure for a plurality of inputs fields and a plurality of electronic forms, the quality measure determined based on a quality needed for an analytics process of an application that uses the input filed data. The method may also include generating a cluster of form data based on the quality measure. The method may further include receiving a request to generate a target quality measure for an electronic form currently being filled in via a user interface. The method may further include determining the target quality measure based on the cluster of form data. The method may also include updating the cluster of form data with the determined target quality measure.

An automated data quality feedback system, in one aspect, may include one or more hardware processors operatively coupled to one or more storage devices. The system may also include a user interface running on one or more of the hardware processor. The user interface may be operable to detect input entered into an input field of a form fillable window provided on a user interface display screen. The user interface may be further operable to request a quality measure associated with the input as entered into the form fillable window, the quality measure determined based on a quality needed for an analytics process of an application for which the input is being entered. The user interface may be further operable to present a graphical indication representing the quality measure on the user interface display screen. The user interface may be further operable to repeat the detecting, the determining, and the presenting until the form fillable window is determined to be completed with entry fields.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system, method, computer product, and techniques are disclosure, that in one embodiment, may provide a data quality feedback for end users while the users enter data in form fields, which for example, may be consumed by data analysts (e.g., manually or by cognitive-based computers). In one embodiment, the methodology of the present disclosure in one embodiment may consider analyzing a set of filled forms and automatically create a data quality reference for the analyzed forms. In one aspect, responsive to detecting that an electronic form is being filled-in, for example, by monitoring a user interface display screen, a comparison may be performed between what is being filled-in and the data quality reference. Responsive to the comparison, a quality measure may be returned to the end users, for example, presented or displayed on the user interface or the like. The methodology of the present disclosure, in one aspect, may increase the value of filled data by providing users awareness of quality of the data they are entering.

The methodology in one embodiment may consider any form filled data and may employ a clustering approach to define how close the data being entered is a good or bad quality entered data. In one embodiment, the methodology of the present disclosure may present data quality feedback to a user while the user is entering data in forms or form fields of a user interface, for example, provide continuous or constant feedback, supporting continuous or constant data quality awareness for the user while the user is filling forms. In one aspect, the quality of data input into the forms is indicated according to data analysts needs. In this way, for example, the digitizer is informed or notified about the data quality of the data being entered. With this information, the quality of data being entered can be improved, for example, at the time of filling or even be informed to complete poor information afterwards.

Figure 1:
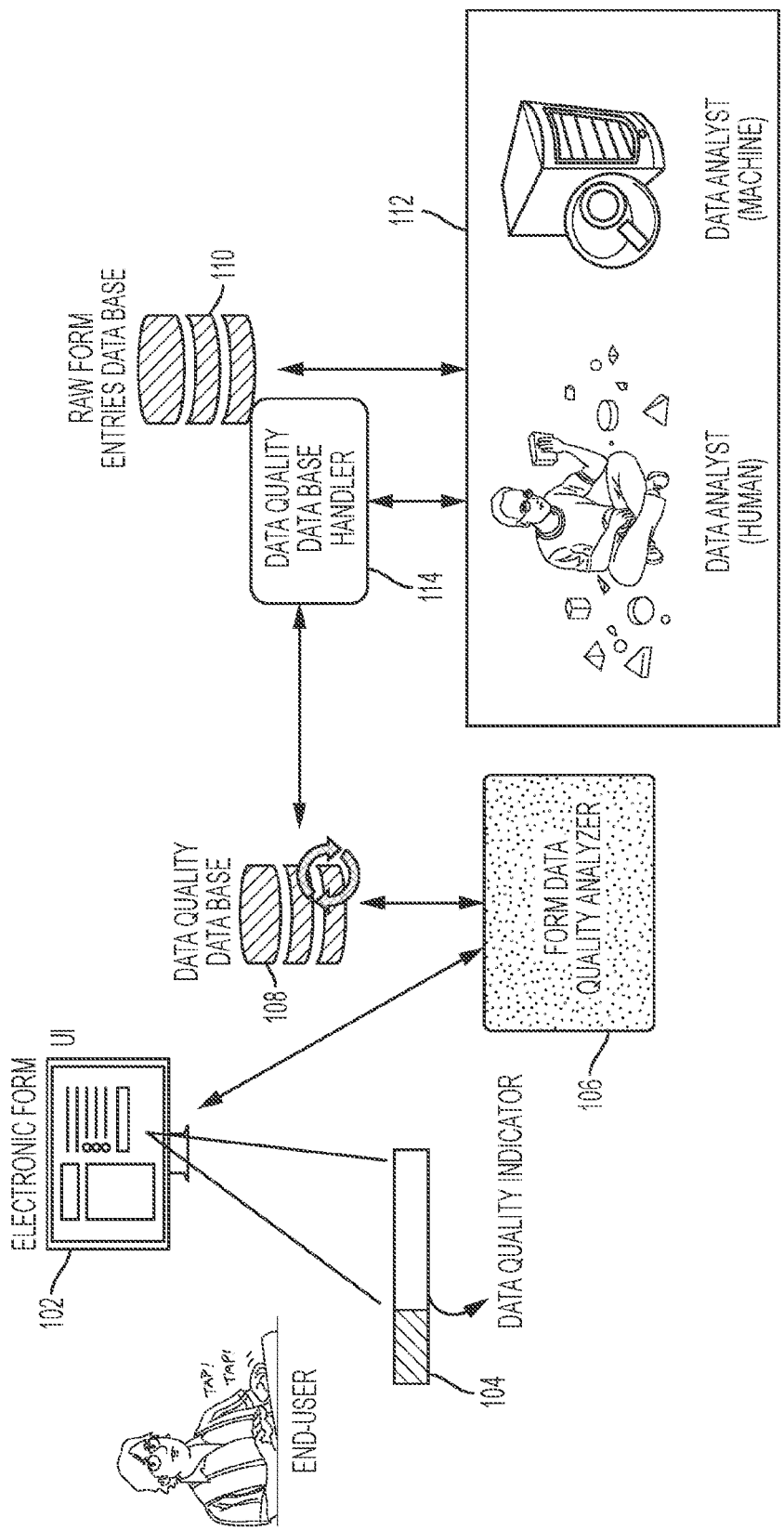
FIG. 1 illustrates components of a system in one embodiment of the present disclosure.

FIG. 1 illustrates components of a system in one embodiment of the present disclosure. An end-user may fill in an electronic form, for example, by inputting data on a user interface 102 of a desktop mobile application and/or web page of a web site, for example, displayed on a display device. Data quality indicator 104 may be provided on the user interface 102 that shows, for example, to the end-user, the quality of the data that is entered to fill the form. Data quality indicator 104 may be represented in a plurality of different ways. For instance, as shown, the data quality measure may be indicated in a sliding bar. Other graphical indications may represent the data quality measure. In another aspect, data quality measure may be indicated as a normalized value.

Form data quality analyzer 106 may execute on one or more processors and compare end-user input data and data in a data quality database 108 to act on the data quality indicator 104 and provide hints and/or consequences of end-user actions of filling forms. The comparison between the entered data and good quality data is performed, for instance, by computing whether the entered data fits into any existing cluster tagged as good quality entries. Another example of the comparison may include computing a correlation between data registered as good quality data and the input data entered by the user. Yet another example of the comparison may include computing whether the entered data fits into an ontology considered for each of the form fields. Other comparisons may be performed.

Responsive to detecting any discrepancy/concordance in the data the user is inputting in the form field on a user interface, the system of the present disclosure updates the quality indicator accordingly, for example, indicating that the quality of the form being entered is poor or good, respectively. In some embodiments, the comparison and acting on the data quality indicator (feedback of the quality) may be performed and provided on a field by field basis, for example, as the user enters a field. In some embodiments, the comparison and acting on the data quality indicator (feedback of the quality) may be after the user submits the whole form, for example, containing multiple form fields.

Data quality database 108 (also referred to as information quality database) may be a database system, for example, storing data in a repository or storage device, and determines good and bad data for forms and their respective fields. In some embodiments, the data base system 108 may be configured in conjunction with a system, which implements form filling related activities. The data quality database 108 may represent an additional quality attribute related to each record in a database associated with the forms. For instance, the data quality database 108 may be implemented as a structured database including identifiers of each record plus the information quality attribute. As another example, the data quality database 108 may be implemented as an additional column in the existing database to represent this new information quality attribute.

In some embodiments, the data quality database 108 can register numeric values (e.g.: 0, poor quality, through 10, high quality), categorical values (e.g.: very low, low, medium, high, very high quality). For instance, consider a medical application, in which users are required to enter patients' information. Once a data analyst (e.g., human or machine) tags the examples of good and bad quality records, the system is capable (e.g., via clustering techniques) to compute in which cluster (a good quality cluster or a bad quality cluster) the new register (new entry) is associated with. For example, responsive to receiving a new information entered as input in a form fillable user interface form fields, the system in some embodiments computes a cluster with which the new entry is associated and provides this information to the user as a feedback for the data being entered.

In some embodiments, the tagging performed, e.g., manually or automatically by a machine, may be performed in a preparation phase (e.g., previous to any data acquisition when setting examples of good and bad quality data) and/or during a data cleaning phase (e.g., post data acquisition and the initial phase of data analysis).

Raw form entries database 110 may include all forms filled by end-users, and stored in a storage device. Data analyst component 112 may include one or more computers that perform data analysis based on data received from end-user filled forms. In one aspect, the data analysis may also be performed manually. Data analyst component 112 determines, for example, for the purposes of using a particular application or performing data analytics, whether the data entered is in good quality form, for example, for use in that data analytics or application procession. Data analyst component 112 may include a machine that learns and determines automatically whether a data entered is in good quality form. The data analyst component 112 may tag the data, for example, in the raw form entries database 110, with a quality measure the data associated with a form or field of the form.

Data quality database handler 114 may execute on one or more processors and may act on the data quality database 108, for instance, adding and/or updating information in the database 108. When the quality database handler adds information, it includes new quality information in the data quality database 108 related to a record in 110. When it updates information, it changes quality information already in the data quality database 108.

In one aspect, components shown at 102, 104 and 106 may run as a front-end application or process, while the components shown at 108, 110, 112 and 114 may run as a back-end application or process.

Figure 2:
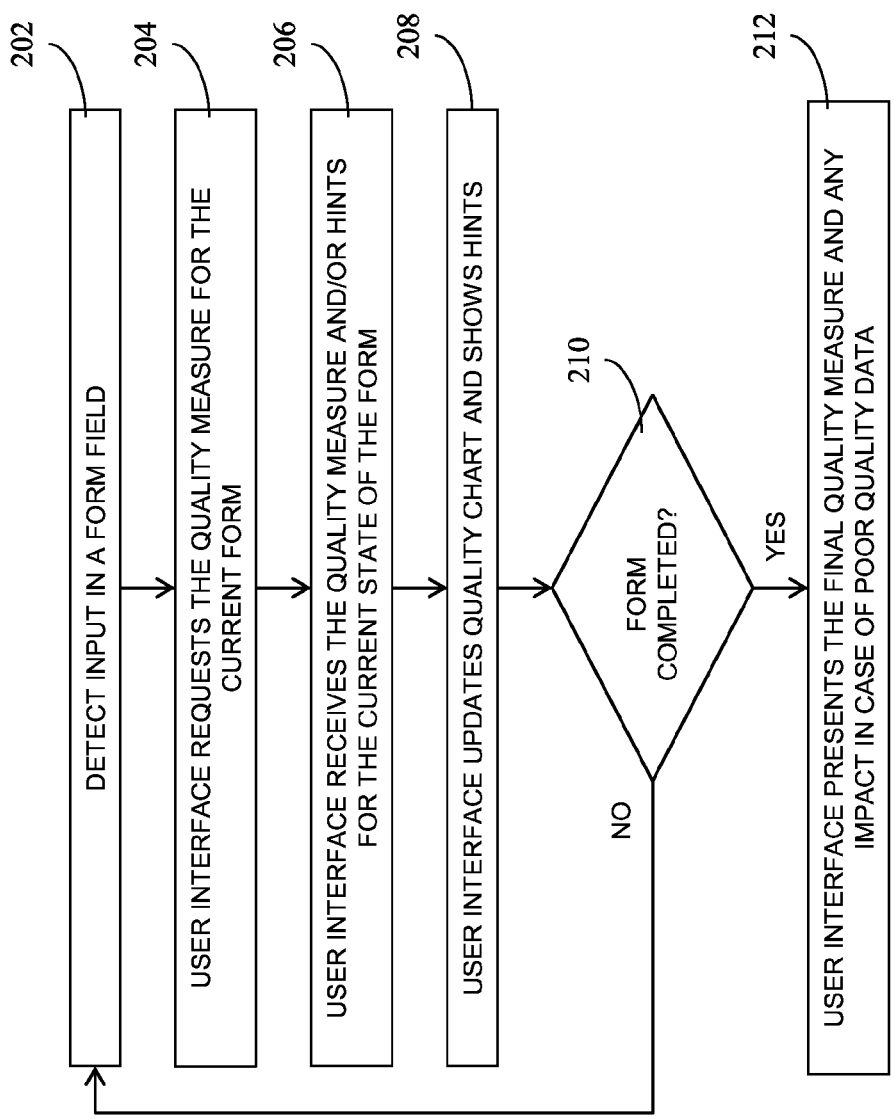
FIG. 2 is a flow diagram illustrating a method, for example, performed by a frond-end processor, in one embodiment of the present disclosure.

FIG. 2 is a flow diagram illustrating a method, for example, performed by a frond-end processor, in one embodiment of the present disclosure. The method, for example, provides automated data quality feedback process, for example, while input is being entered to fill-in a form, for example, an electronic form displayed on a user interface window.

At 202, an application such as a user interface or like application running on one or more hardware processors may monitor for input data on a user interface display and detect that an input has been entered. For example, the user interface may detect input entered into an input field of a form fillable window provided on a user interface display screen. In some embodiments at 202, the user interface or another module receiving the user's input may request a quality measure associated with the input after the user finishes entering a form field or at each key stroke performed by the user.

The user interface determines a quality measure associated with the input as entered into the form fillable window. For example, at 204, the user interface requests the quality measure for the current form, for instance, the quality measure for the input data as associated with the current form. In one embodiment, there may be a quality measure related to the field being filled, and/or a quality measure related to the current state of the form (e.g., considering how much the form was filled), and/or related to the all fields of the form (e.g., considering that the fields not yet filled may be submitted with the default values). Moreover, different fields may have different weights, for example, which may be defined according to the data analyst needs. The quality measure is determined based on a quality needed for an analytics process of an application for which the input is being entered.

In one embodiment of a system and/or method of the present disclosure considering clustering techniques, the quality measure used for providing user feedback may be computed as the normalized inverse of the distance that the data filled by the user is in relation to the closest good quality cluster. For instance, if the data entered fits into a good quality cluster (distance is 0 in relation to the closest good quality cluster), then the data quality presented to the user is 100% or very high. If the data entered fits into a poor quality cluster (distance is 0 in relation to the bad quality cluster), the data quality indicator is 0% or very low. Another examples may involve intermediate cases, when the data input is in between two clusters, a good quality cluster and a bad quality cluster, resulting in low, medium low, medium, or medium high value for the quality feedback user interface element depending on how far the data entered by the user is in relation to the closest good quality cluster.

For example, the user interface may request the form data quality analyzer component for such quality measure for the current form. The form data quality analyzer may look up a data quality database and determine the quality measure. In one embodiment, the user interface may invoke a process running on one or more hardware processors to compare the input with previously measured data stored in a database of quality measures. The database of quality measures in one embodiment stores quality measures associated with form entries, determined based on manual tagging, automatic cognitive analysis, machine learning, clustering and/or other techniques.

At 206, the user interface may receive the quality measure and/or hints. Hints may be for improving the data quality of the data being filled in and providing guidance for users on how to achieve good quality records. To retrieve one or more hints, the system reads one or more records from a data quality database 108, registered as good quality records, and returns them to the user, presenting them next to the form field being filled.

At 208, the user interface may update the quality measure, for example, present or display a quality bar indicator or another graphical indication such as a chart, and/or display a normalized quality measure value.

At 210, it is determined whether the filling of the form is completed, for example, by determining whether all input fields have been entered, or all required input fields have been entered. If so, at 212, the user interface may present the final quality measure and any impact. For instance, the impact may be the impossibility of billing a purchase or to proceed with health insurance claiming process, as a result of submitting a form with poor quality information. If at 210, it is determined that the form filling is not completed, the logic returns to 202 to process more input.

Figure 3:
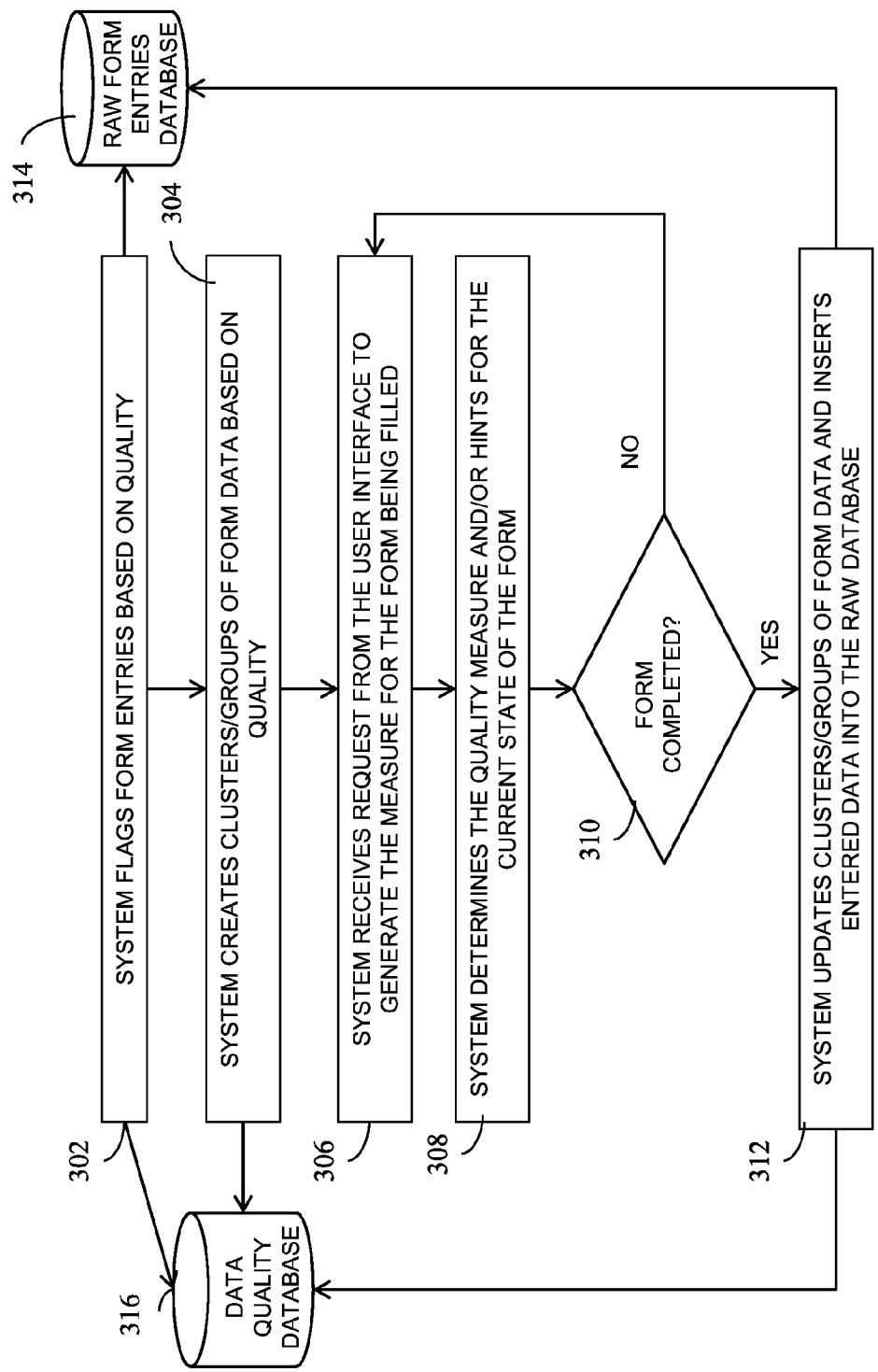
FIG. 3 is a flow diagram illustrating a method, for example, performed by a back-end processor, in one embodiment of the present disclosure.

FIG. 3 is a flow diagram illustrating a method, for example, performed by a back-end processor, in one embodiment of the present disclosure. At 302, data analyst flags form entries based on quality. For instance, forms and their fillable fields stored in a database 314 may be annotated with quality measure or indications and stored at 316. In order to tag the existing entries, a data analyst (human or machine) may set the quality for a reduced set or subset of records. For example, in a manually set quality, a user such as a data analyst analyzing the data may set the quality of a reduced set of selected records, for example, selected at random or as representatives for a multitude of entries. In the case of machine analysis, a cognitive system may be used to validate records present at 314. For example, the raw records present in 314 may be annotated with a quality measure related to each record. For instance, if there exists a row in a table people with id=1, name=userX, email=userX@.xyz.com, then, the database at 316 may store a table pointing to the table people, id=1, with attribute, quality=good.

At 304, a hardware processor, for example, a data quality data base handler running one or more processors, may create clusters or groups of form data based on quality. At 306, a request is received, for example, from a front-end user interface application or processor, to generate a quality measure for the form being filled. The request may include the form identifier, a field identifier and associated input data of the field At 308, a hardware processor, e.g., form data quality analyzer running on one or more of hardware processors, may determine or retrieve quality measure and/or hints for the current state of the form. At 310, it is determined whether the form is completed, for example, whether all required fields in the form has been filled-in. If it is completed, a hardware processor updates clusters/groups of form data in data quality database 316 and inserts entered data into the raw database 314. The cluster in which the new information (entered data) belongs is updated with the new entered data. If the form is not completed, logic iterates at 306, in which a hardware processor continues with responding to requests to generate the measure for the form being filled.

The methodology described herein may be implemented for any form fillable electronic forms, for example, presented via a user interface running on a device such as a mobile device or a computer device. As an example use scenario, the methodology may be implemented on a user interface that displays a medical form. For instance, a physician or the like may be filling in a form during or after performing a medical examination. Incorrectly input data may cause inefficiency in the medical process, payment process for the medical service, and/or statistical analyses that may be performed on the data, and correcting the data may create further inefficiency. In one aspect, the methodology of the present disclosure may address such as problem, for example, by automatically showing or notifying a user (e.g., in real time) the quality of the input data placed or entered into the electronic form.

Figure 4:
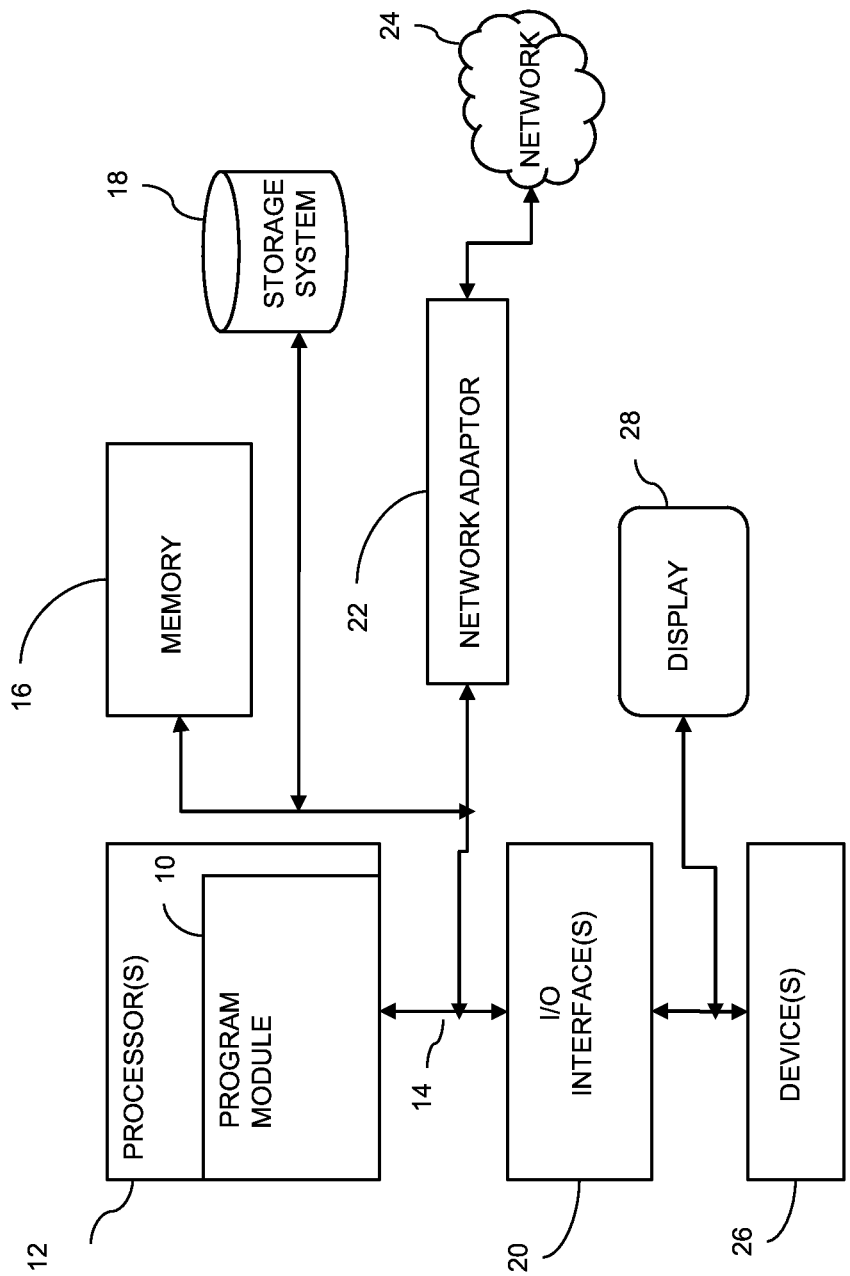
FIG. 4 illustrates a schematic of an example computer or processing system that may implement a data quality feedback system in one embodiment of the present disclosure.

FIG. 4 illustrates a schematic of an example computer or processing system that may implement a data quality feedback system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. An automated data quality feedback method, the method performed by one or more processors, comprising:
   detecting input entered into an input field of a form fillable window provided on a user interface display screen;
   determining a quality measure associated with the input as entered into the form fillable window, the quality measure determined based on a quality needed for an analytics process of an application for which the input is being entered;
   presenting a graphical indication representing the quality measure on the user interface display screen;
   presenting a hint in entering the input that improves the quality measure, the hint presented by at least retrieving a record registered as good quality from a database of quality measures and presenting the record adjacent to the input being entered, the hint presented on the form fillable window comprising the input field being entered based on the detecting of the input entered into the input field and the determining of the quality measure associated with the input as entered into the form fillable window; and
   repeating the detecting, the determining, and the presenting until the form fillable window is determined to be completed with entry fields.

2. The method of claim 1, wherein the determining a quality measure associated with the input as entered into the form fillable window comprises determining a quality measure representing a current input entered into the form fillable window.

3. The method of claim 1, wherein the determining a quality measure associated with the input as entered into the form fillable window comprises determining a quality measure representing all input entered into the form fillable window up to a current state of the form fillable window.

4. The method of claim 1, wherein the determining a quality measure associated with the input as entered into the form fillable window comprises determining a quality measure representing all input in all fields of the form fillable window, wherein unentered field is represented with a default value.

5. The method of claim 1, wherein the determining a quality measure associated with the input as entered into the form fillable window comprises invoking one or more of the processors to compare the input with previously measured data stored in the database of quality measures.

6. The method of claim 5, wherein the database of quality measures stores quality measures associated with form entries, determined based on automatic cognitive analysis and machine learning.

7. The method of claim 1, wherein the input field has an associated weight for determining the quality measure.

8. The method of claim 1, wherein the method is performed while the form fillable window is being filled in.

9. The method of claim 1, wherein the database of quality measures is updated with the input based on the quality determined of the input, and the input is stored in a raw form entries database.

10. An automated data quality feedback system, comprising:
   one or more hardware processors operatively coupled to one or more storage devices;
   a user interface running on one or more of the hardware processors,
   the user interface operable to detect input entered into an input field of a form fillable window provided on a user interface display screen,
   the user interface further operable to request a quality measure associated with the input as entered into the form fillable window, the quality measure determined based on a quality needed for an analytics process of an application for which the input is being entered,
   the user interface further operable to present a graphical indication representing the quality measure on the user interface display screen,
   the user interface further operable to present a hint in entering the input that improves the quality measure, the hint presented by at least retrieving a record registered as good quality from a database of quality measures and presenting the record adjacent to the input being entered, the hint presented on the form fillable window comprising the input field being entered based on the detecting of the input entered into the input field and the determining of the quality measure associated with the input as entered into the form fillable window, and
   the user interface further operable to repeat the detecting, the determining, and the presenting until the form fillable window is determined to be completed with entry fields.

11. The system of claim 10, wherein the quality measure determined represents a measure associated with a current input entered into the form fillable window.

12. The system of claim 10, wherein the quality measure determined represents a measure associated with all input entered into the form fillable window up to a current state of the form fillable window.

13. The system of claim 10, wherein the quality measure determined represents a measure associated with all input in all fields of the form fillable window, wherein unentered field is represented with a default value.

14. The system of claim 10, wherein the user interface is further operable to invoke one or more of the processors to compare the input with previously measured data stored in the database of quality measures, to determine the quality measure associated with the input as entered into the form fillable window.

15. The system of claim 14, wherein the database of quality measures stores quality measures associated with form entries, determined based on automatic cognitive analysis and machine learning.

16. The system of claim 10, wherein the input field has an associated weight for determining the quality measure.

17. The system of claim 10, wherein the user interface monitors the form fillable window while the input is being entered into the form fillable window.

18. The system of claim 10, wherein the database of quality measures is updated with the input based on the quality determined of the input, and the input is stored in a raw form entries database.

* * * * *